United States Patent [19]

Wirz et al.

[11] Patent Number: 4,671,628
[45] Date of Patent: Jun. 9, 1987

[54] OPTICAL APPARATUS FOR PRODUCING A VISUAL STEREOSCOPIC IMAGE

[75] Inventors: Paul Wirz, Au; Johann Draxl, Berneck, both of Switzerland

[73] Assignee: Projectina Heerbrugg AG, Heerbrugg, Switzerland

[21] Appl. No.: 663,365

[22] Filed: Oct. 22, 1984

[30] Foreign Application Priority Data

Nov. 3, 1983 [CH] Switzerland ............... 5937/83

[51] Int. Cl.$^4$ .................................................. G02B 21/22
[52] U.S. Cl. ................................................... 350/515
[58] Field of Search ............... 350/511, 513, 514, 515, 350/516, 517, 130, 145, 618, 623, 137, 138

[56] References Cited

U.S. PATENT DOCUMENTS

| | | | |
|---|---|---|---|
| 1,114,232 | 10/1914 | Chéron | 350/516 |
| 1,655,850 | 1/1928 | Watts | 350/130 |
| 3,658,412 | 4/1972 | Seaman | 350/410 |
| 3,704,932 | 12/1972 | Schick | 350/516 |
| 3,833,288 | 9/1974 | Nilsson | 350/431 |
| 3,964,818 | 6/1976 | Humphrey | 350/515 |
| 4,175,826 | 11/1979 | Blaha et al. | 350/516 |
| 4,412,727 | 11/1983 | Taira | 350/514 |
| 4,518,231 | 5/1985 | Muchel et al. | 350/515 |

Primary Examiner—John K. Corbin
Assistant Examiner—Vincent J. Lemmo
Attorney, Agent, or Firm—William R. Hinds

[57] ABSTRACT

In the image-side beam path of an objective lens are roof-like mirrors for pupil separation. The two beams pass to a mirror means where the two beams are directed on to an intermediate image plane by pivotal mirrors. The two optical axes cross in the intermediate image plane. In the region of the intermediate image plane is a field lens which feeds the beams to the eyes by way of a beam exit lens. That arrangement provides a stereoscopic image with large depth of focus. The exit pupils are larger than those of the eyes so that the viewer has a certain range of possible movement.

7 Claims, 5 Drawing Figures

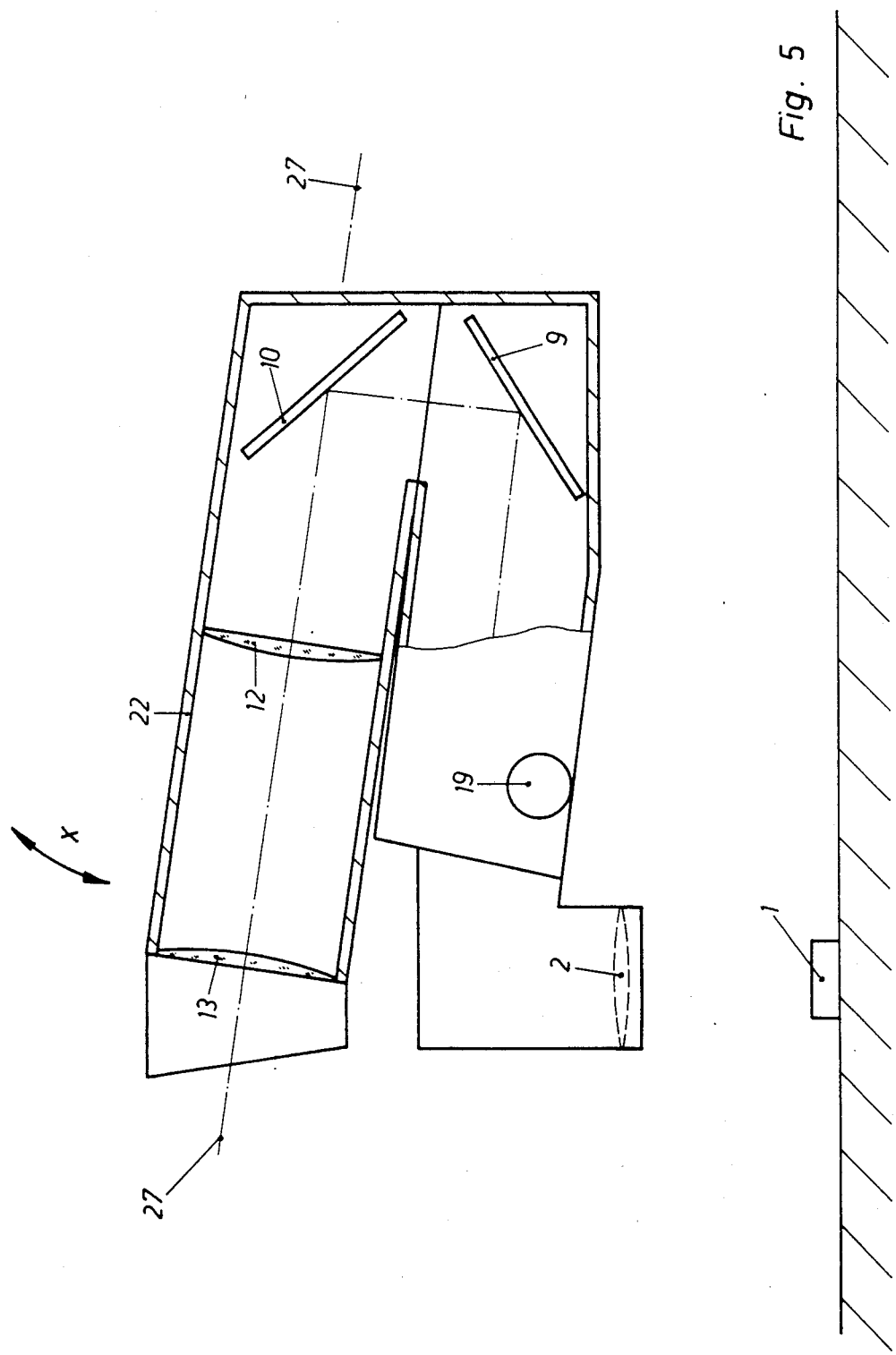

OPTICAL APPARATUS FOR PRODUCING A VISUAL STEREOSCOPIC IMAGE

FIELD OF THE INVENTION

This invention relates to an optical apparatus for producing a visual stereoscopic image having two entrance pupils and means for bringing together the two beams on an intermediate image plane and a beam exit lens for viewing the image without eyepieces.

BACKGROUND OF THE INVENTION

Three-dimensional viewing is of major significance for many industrial control operations. Thus, such apparatuses are used for example for controlling solder locations on printed circuits. In contrast to normal stereo microscopes, the exit pupil is greatly enlarged so that the eye of the viewer does not have to be in a precisely defined position in order to be able to observe the iamge. With that arrangement, the viewer does not have to look into two separate eyepiece tubes for a prolonged period of time, as is the case with conventional stereo microscopes. That affords ergonomic advantages and also results in less rapid eye fatigue.

PRIOR ART

Swiss Pat. No. 619 791 discloses a magnification apparatus of the kind set forth in the opening part of this specification, wherein pupil separation is effected by way of a conventional stereoscopic objective lens system based on the Greenough principle. The two separate beams of light are focused on to an intermediate image plane by way of a mirror complex and by a pair of projection lens systems. Disposed in the intermediate image plane is a pair of transparent discs provided with grooves. The discs are rotated so that the individual grooves produce enlarged exit pupils, as a result of the scatter or diffusion effect. The viewer sees an image which is materialised on the transparent discs in the intermediate image plane.

The disadvantage of that apparatus lies in the reduced quality of the image. The depth of focus is restricted by virtue of the image position fixing effect on the rotary disc. In addition, when viewing for a prolonged period of time, the viewer suffers from eye fatigue as it is not possible to eliminate slight flickering of the image. In addition, the dynamic system with the rotary disc is liable to trouble as the image cannot be viewed in the event of failure of the drive.

Stereo viewing apparatuses are also already known, wherein pupil separation is effected by crossed polarisation. Beams which are to go to one eye due to parallel positioning of the polarisers are blocked in respect of the other eye of the crossed positioning of the polarisers. That principle suffers from the serious disadvantages of image darkening due to the dichroic polarisers. In the best case, only 30% of the light is still transmitted. That arrangement therefore requires an excessively high level of lamp output, which also results in a relatively high level of power consumption.

BRIEF DESCRIPTION OF THE INVENTION

Therefore, the object of this invention is to provide an apparatus of the kind set forth in the opening part of this specification, which eliminates the disadvantages of the known apparatuses and in particular upon amplification of the stereo effect, produces enlarged exit pupils, without the quality of the image and the depth of focus being reduced. Another object of the invention is that the apparatus can be adjusted by any viewer to his individual requirements, that is to say, in particular the inter pupillary spacing of the exit pupils can be adjusted in a very simple manner.

In accordance with the invention, that object is achieved by an apparatus having a field lens arranged in the region of the intermediate image plane. A non-materialised air image can be observed through the field lens which is disposed in the intermediate image plane. That means that the full accommodation movement of the eyes can be used for depth perception. The depth of focus increases with increasing brightness as the image-forming geometry is controlled by the magnitude of the pupils of the eye. The field lens also has the advantage that there are no or only limited light losses due to diffuse scatter.

A particular degree of operator comfort and convenience is achieved if, for bringing the two beams together on the intermediate image plane, there is a mirror means on to which the two beams impinge, and if the mirror means has for each beam a fixed mirror with which it can be deflected on to a pivotal mirror, and if moreover the distance between the two pivotal mirrors can be adjusted in order to adapt the exit pupils to the spacing of the eyes of the viewer. In that way, the exit pupils are not fixedly set to an average inter-pupillary spacing in the person viewing through the apparatus. On the contrary, each viewer can set the otimum pupil spacing, by way of a simple adjusting mechanism.

The mirror means may be embodied in a particularly simple fashion if the two pivotal mirrors each have a pivotal lever which bears against a cam disc for pivoting the lever and if each of the pivotal levers can be pressed against the cam disc by a spring. Depending on the respective length of the lever arm of the pivotal lever and the angle of the inclination of the surface of the cam disc, that arrangement makes it possible to ensure extremely precise adjustment of the optical axes.

If the two cam discs are disposed on a common axis of rotation and if the two pivotal levers are connected to a tension spring or can be pressed against the cam discs, that arrangement ensures absolutely uniform movement of the two pivotal mirrors.

As, when the two mirrors pivot, it will be apparent that the point of intersection of the optical axes in the intermediate image plane also alters, additional or simultaneous adjustment of a further element is required. Advantageously, that correction operation is also carried out in the mirror means in a particularly simple fashion by virtue of the fixed mirrors being displaceable on a carriage along the centre line between the two pivotal mirrors, with the carriage being displaceable simultaneously with the pivotal mirrors by means of the rotary spindle.

Light losses can be eliminated by pupil separation being effected by way of a pair of mirrors, which receive beams from a main objective lens, wherein the pair of mirrors projects two separate beams on to subsequent lenses or on to the mirror means. That provides for geometrical pupil separation with separate optical axes.

if the article to be observed is disposed in the plane of the focus, which is on the object side, of the main objective lens, then the main objective lens produces an image at infinity and the beams between the main objective lens and the intermediate objective lens system are then parallel. Therefore, for focusing purposes, the main objective lens can be displaced along its central optical axis without thereby altering the image scale of the entire system. The position of the intermediate image plane remains constant.

A further degree of operator comfort is achieved if the beam exit lens and the field lens are disposed in a housing, the longitudinal axis of which is pivotal, and if at least one pivotal mirror is provided in the ray path between the mirror means and the field lens. By virtue of that arrangement, the viewer can adapt the exit angle of the beams individually to his body posture. The pivotal mirror provides for geometrically correct diversion of the beams in accordance with the respective relative angle of the axis of emergence.

The exit pupil can be further enlarged if at least one side of the field lens has a fine and transparent surface structure, for producing a slight diffusion effect. The above-mentioned surface structure may be provided for example by an applied emulsion. The emulsion may be for example a clear lacquer which produces an irregular surface when it dries. The surface structure does not cause any image materialisation so that the quality of the air image in the intermediate image plane is not adversely affected.

BRIEF DESCRIPTION OF THE DRAWINGS

An embodiment of the invention is described in greater detail hereinafter and illustrated in the drawings in which:

FIG. 5 shows a highly simplified side view of the apparatus according to the invention.

DETAILED DESCRIPTION OF THE PREFERRED EMBODIMENT

Figure 1:
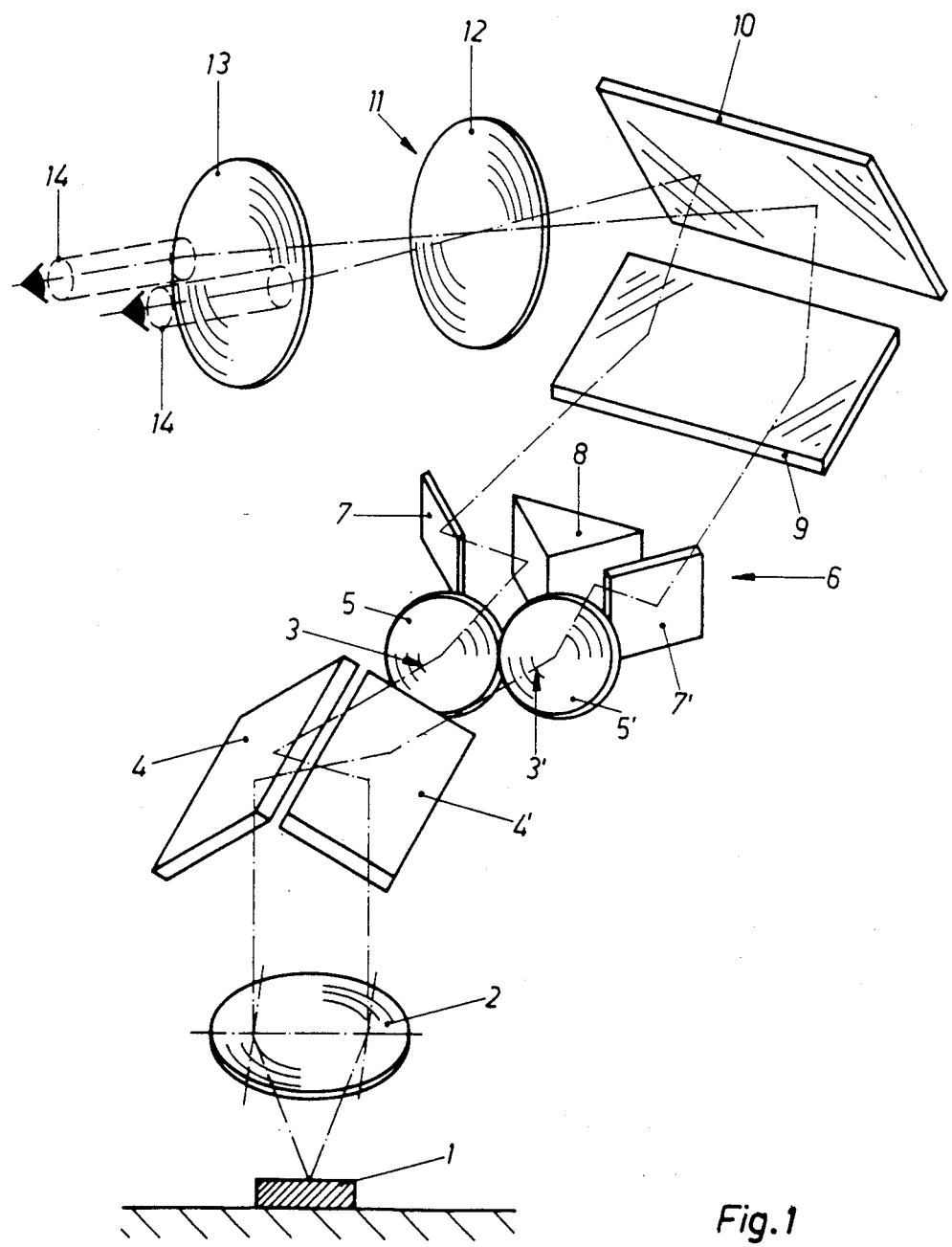
FIG. 1 shows a diagrammatic view of the apparatus according to the invention.

As shown in FIG. 1, the article 1 to be observed is disposed in the focal plane of the main objective lens 2. The main objective lens 2 must be of such dimensions that the exit pupils at the magnification device are larger than those of the eyes of the viewer. The main objective lenses used may be interchangeable fixed focus systems or a variable lens system. The image of the article 1 is formed at infinity by the main objective lens. Alternatively, the main objective lens may also directly provide for focusing of the beams on to the intermediate image plane. Arranged directly after the main objective lens 2, in its beam path, on both sides, is a right-angled pair of roof edge mirrors 4 and 4' for geometrical beam separation. The pair of mirrors 4 and 4' perform the function of an image-rotation correcting element so that the viewer sees the magnified article 1 in the correct relative position. The two parallel beams or rays 3 and 3' go from the pair of mirrors 4, 4' by way of an intermediate lens systems 5, 5' on to the mirror means 6. The beams are focused at the intermediate image plane 11 with the intermediate lens system.

The mirror means 6 causes the two incoming beams with optical axes 3 and 3' to be converged in such a way that the optical axes intersect in the intermediate image plane 11 and the images are then superimposed on each other there. The two deflection mirrors 9, 10 are only provided to define the beam configuration in such a way that the apparatus can be adapted to the practical circumstances.

A field lens 12 is disposed in the intermediate image plane 11 where the two component images are in an overlapping condition, or in the direct vicinity of the plane 11. The field lens 12 passes the inclined beams by way of the beam exit lens 13 to the eyes. The optical axes 3 and 3' diverge in the direction of the exit lens 13 and from there are passed separately to the two eyes, in a parallel or slightly convergent condition. The two exit pupils 14 are larger than the maximum possible pupil of the eye.

Figure 2:
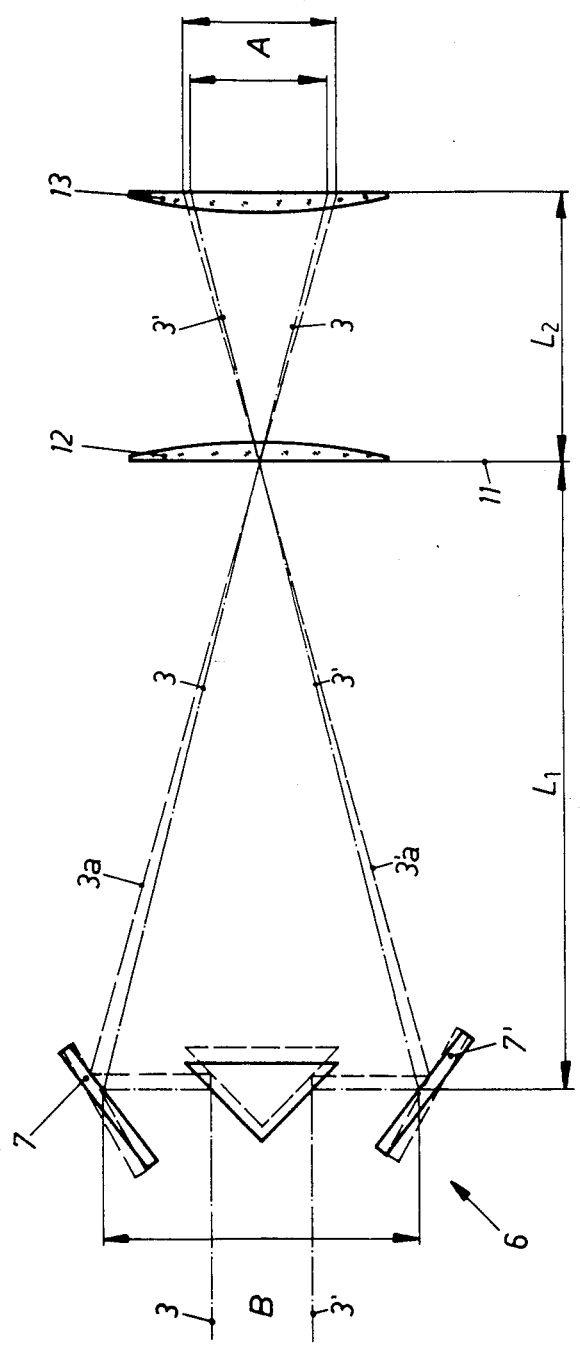
FIG. 2 shows a diagrammatic view of the beam configuration which represents the mathematical interrelationship of the inter-pupillary spacing.

FIG. 2 shows a diagrammatic plan view of the two optical axes 3 and 3' between the mirror means 6 and the exit lens 13. In that respect, the distance B is the spacing between the points of reflection of the optical axes on the pivotal mirrors 7 and 7'. In the plane of the exit lens 13, the distance A is equal to the interpupillary spacing of the exit pupils. The two optical axes cross at the image forming plane 11, wherein L1 represents the distance between the mirrors 7 and 7' and the intermediate image plane 11 and L2 represents the distance between the intermediate image plane 11 and the exit lens 13. The equation for the individual dimensions is as follows:

$$B/A = L1/L2$$

that gives, for the inter-pulillary spacing:

$$A = B(L2/L1)$$

it will be seen that, with that interrelationship, it is possible for the inter-pupillary spacing between the exit pupils to be varied by adjusting the mirror means 6. An altered pupil spacing is indicated by the optical axes 3a and 3'a.

Figure 3:
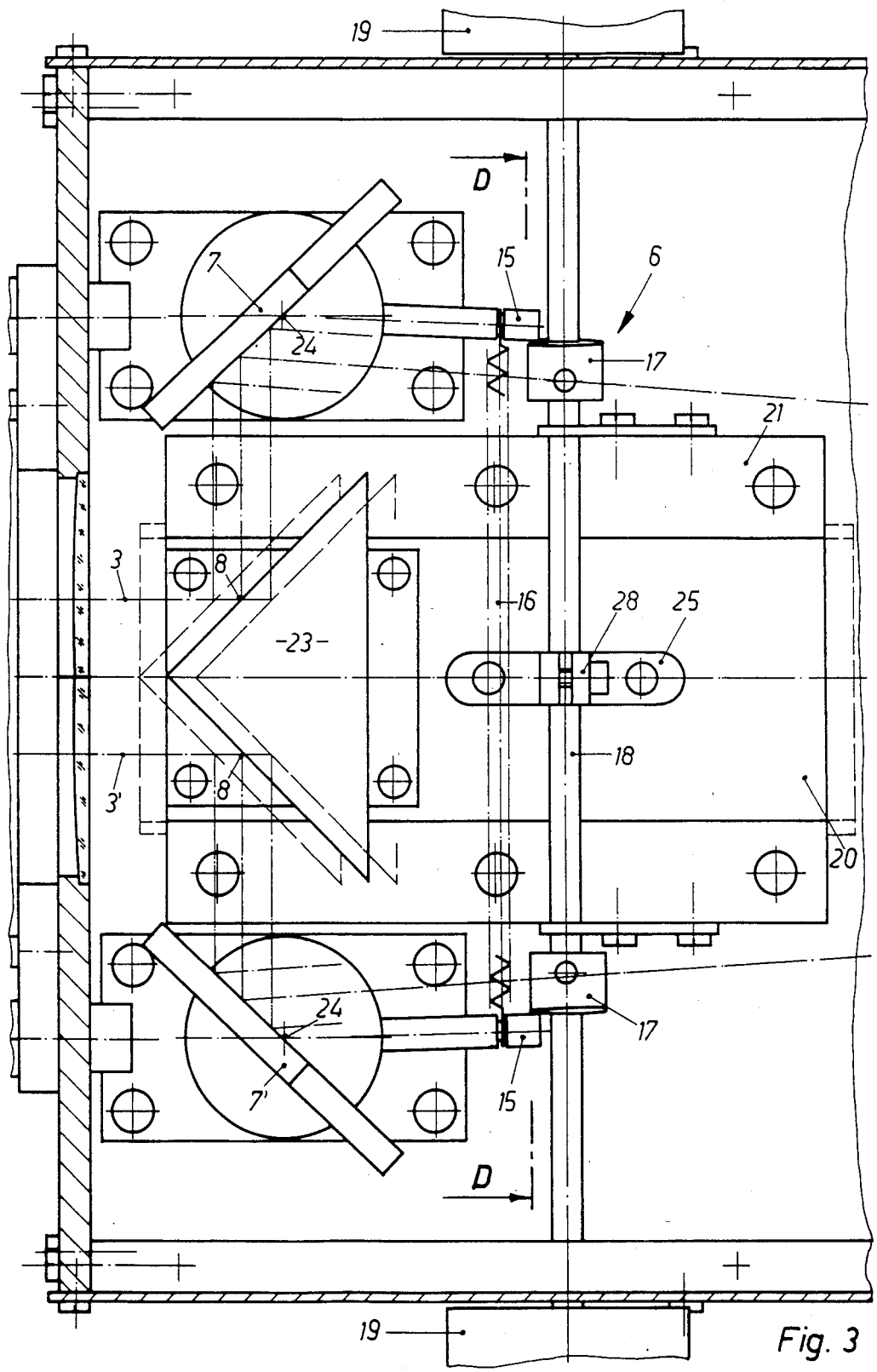
FIG. 3 shows a plan view of the mirror means.
Figure 4:
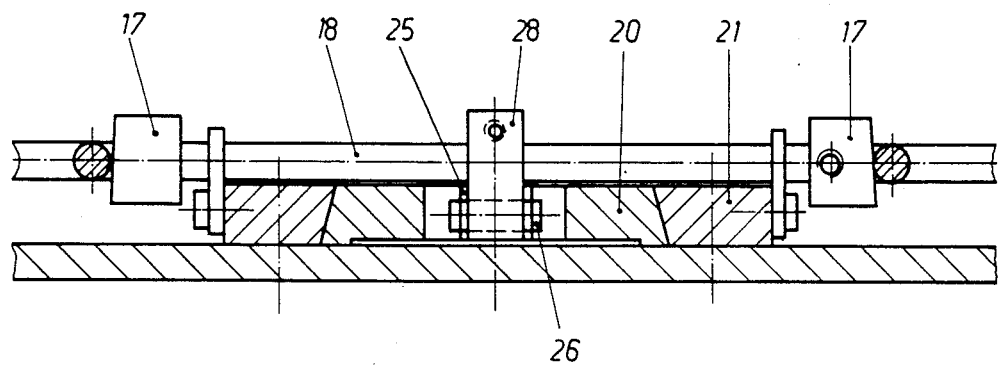
FIG. 4 shows a view of part of the arrangement in cross-section taken along line D—D in FIG. 3.

Adjustment at the mirror means 6 is shown in FIGS. 3 and 4. The two optical axes 3 and 3' which impinge in a parallel condition on to the mirror means are deflected outwardly by two fixed mirrors 8. The two fixed mirrors 8 are the outside surfaces of a reflective or mirror-coated prism 23. Disposed on both sides of the prism 23 are pivotal mirrors 7 and 7', by means of which the two optical axes 3 and 3' are brought together in the intermediate image plane.

The two mirrors 7 and 7' are mounted rotatably about a centre line 24 and are each connected to a respective pivotal lever 15. The ends of the two pivotal levers are connected together by way of a tension spring 16, whereby the pivotal levers are simultaneously pressed against a respective cam disc 17, the cam discs 17 being arranged on a common rotary spindle 18. The rotary spindle 18 extends through the wall of the housing and there has a rotary knob 19 for rotating the spindle. When the rotary knob 19 is rotated, it will be seen that both ends of the pivotal levers 15 are moved towards each other or away from each other by means of the cam discs. That also alters the angle of the optical axes which diverge after the intermediate image plane, and thus also the interpupillary spacing of the exit pupils.

In order to ensure that the two optical axes always intersect at the intermediate image plane, it will be seen that, upon pivotal movement of the mirrors 7 and 7', the prism 23 must also be displaced on the center line between the two pivotal mirrors. Advantageously, that is effected simultaneously with the pivotal movement of the mirrors 7 and 7', as otherwise two separate adjustment operations would be required. In the illustrated embodiment, the reflective prism 23 is mounted on a carriage 20 which is displaceable in a carriage guide means 21. The carriage may have for example a longitudinal slot 25 into which is fitted an entrainment pin 26. An entrainment fork 28 which is fixed on the rotary spindle 18 engages over the entrainment pin 26. By virtue of that arrangement, when the rotary spindle 18 is rotated, not only are the two mirrors 7 and 7' pivoted but at the same time the fixed mirrors 8 or the reflective prism 23 are also displaced. The dimensioning of the individual components or correct choice of the length of the lever arm of the two pivotal levers, the configuration of the cam discs or the correct tooth system, do not represent any problem from the point of view of the man skilled in the art and are therefore not described in greater detail herein. It will be appreciated that other adjusting arrangements can also be envisaged without thereby departing from the subjectmatter of the invention. Thus for example it would be possible for the carriage 20 to be displaceable in the carriage guide means 21 by a separate adjusting screw. The two pivotal mirrors could be displaced by other means, for example by way of gears and worm gears disposed in opposite directions. It would also be possible for the carriage 20 to carry a toothed rack which engages with a gear on the rotary spindle.

Finally, FIG. 5 shows a diagrammatic side view of an apparatus according to the invention on a greatly reduced scale. The ray path is deflected by the upper deflection mirror 9 and the lower deflection mirror 10 in such a way that the apparatus is of a practical configuration. The exit lens 13 and the field lens 12 are disposed in a housing 22, the longitudinal axis 27 of which is displaceable in the direction indicated by the arrow X, relative to the rest of the apparatus. That arrangement means that the viewer can adapt the apparatus to his individual needs, depending on the seat height or the relative position of his eyes. At least one of the mirrors 9 or 10 must also be pivoted upon pivotal movement on the axis of the housing, in order to ensure geometrically correct projection of the two optical axes. The pivotal movement of the deflection mirror is effected mechanically, at the same time as the pivotal movement of the housing.

At least one side of the field lens 12 may be provided with a fine and transparent surface structure. That provides for a low degree of diffusion of the beam on leaving the field lens, and thus magnification of the exit pupils, without adversely affecting the quality of the image. The fine surface structure may be produced for example when manufacturing the lens, by suitable surface machining of the pressing tool. The surface structure however may also be produced by applying an emulsion, for example by applying to the field lens a clear lacquer which gives a structured surface when it dries.

We claim:

1. An optical apparatus for producing a visual stereoscopic image of one object, the apparatus comprising a main objective lens with a focus approximately in the plane of said object, means for providing two entrance pupils of said object, said means receiving beams from the main objective lens, further means for bringing together two beams when respectively received from said entrance pupils, whereby said two beams intersect on an intermediate image plane, a field lens mounted in the region of said intermediate image plane, and a beam exit lens mounted to present an image formed by said field lens directly to a person viewing such image, and in which said means for bringing together said two beams on said intermediate image plane comprise two primary mirrors and two pivotal mirrors respectively associated with said primary mirrors, whereby each primary mirror reflects a respective one of said beams onto the associated one of said pivotal mirrors, the apparatus further including mechanism for deflecting said pivotal mirrors to adapt the image viewed through said exit lens to the eye spacing of the person viewing the image.

2. Apparatus according to claim 1 in which said means for providing two entrance pupils comprise said main objective lens and a pair of mirrors arranged to receive beams from said main objective lens and respectively deliver two beams to said means for bringing together said two beams.

3. An optical apparatus for producing a visual stereoscopic image, the apparatus comprising means for providing two entrance pupils, means for bringing together two beams when respectively received from said entrance pupils, whereby said two beams intersect on an intermediate image plane, a field lens mounted in the region of said intermediate image plane, and a beam exit lens mounted to present an image formed by said field lens dirctly to a person viewing such image, said means for bringing together said two beams on said intermediate image plane comprising two primary mirrors and two pivotal mirrors respectively associated with said primary mirrors, whereby each primary mirror reflects a respective one of said beams onto the associated one of said pivotal mirrors, the apparatus further including mechanism for deflecting said pivotal mirrors to adapt the image viewed through said exit lens to the eye spacing of the person viewing the image, said mechanism comprising two levers respectively fixed to said pivotal mirrors, two movably mounted cam members respectively engaging said levers, spring means maintaining said levers in contact with said cam members and means for moving said cam members to adjust the deflection of said pivotal mirrors.

4. Apparatus according to claim 3 in which said cam members comprise two rotatably mounted cam members respectively engaging said levers, said spring means comprises a spring connecting said levers for maintaining them in contact with said cam members and said means for moving said cam members comprises means for simultaneously rotating said cam members to adjust the deflection of said pivotal mirrors.

5. An optical apparatus for producing a visual stereoscopic image, the apparatus comprising means for providing two entrance pupils, means for bringing together two beams when respectively received from said entrance pupils, whereby said two beams intersect on an intermediate image plane, a field lens mounted in the region of said intermediate image plane, and a beam exit lens mounted to present an image formed by said field lens directly to a person viewing such image, said means for bringing together said two beams on said intermediate image plane comprising two primary mirrors and two pivotal mirrors respectively associated with said primary mirrors, whereby each primary mirror reflects a respective one of said beams onto the associated one of said pivotal mirrors, the apparatus further including mechanism for deflecting said pivotal mirrors to adapt the image viewed through said exit lens to the eye spacing of the person viewing the image, said pivotal mirrors being respectively deflectable about fixed axes, and the apparatus including a carriage mounted to travel along a centre line perpendicular to a line joining said fixed axes, said primary mirrors being mounted on said carriage.

6. Apparatus according to claim 5 comprising means including a rotary spindle inter-connecting said carriage and said pivotal mirrors whereby said carriage is displaced on said centre line simultaneously with deflecting movements of said pivotal mirrors by said rotary spindle.

7. Optical apparatus for producing a visual stereoscopic image having two entrance pupils and means for bringing together two beams from said two entrance pupils on an intermediate image plane prior to passing through an exit lens for direct viewing, the apparatus comprising a main objective lens for conducting the beams from an object to be viewed, a pair of mirrors for geometrical pupil separation mounted to receive the beams from said main objective lens, a pair of intermediate lenses for focusing the beams in the intermediate image plane, mirror means mounted to receive the separated beams from said pair of mirrors, said mirror means including pivotal mirrors for causing the separated beams to converge in said intermediate image plane, and a field lens disposed in the region of the intermediate image plane for passing the beams, inclined to one another, to the exit lens.

* * * * *